(No Model.)

T. BACKLEJAU.
PRESSURE REGULATOR.

No. 408,788. Patented Aug. 13, 1889.

Witnesses
Walter P. Keen
F. L. Middleton

Inventor
Theophile Backlejau
By Ellis Spear
Attorney

UNITED STATES PATENT OFFICE.

THÉOPHILE BACKLEJAU, OF MECHLIN, BELGIUM.

PRESSURE-REGULATOR.

SPECIFICATION forming part of Letters Patent No. 408,788, dated August 13, 1889.

Application filed June 10, 1889. Serial No. 313,690. (No model.) Patented in Belgium September 10, 1888, No. 83,217, and in Luxemburg May 13, 1889, No. 1,134.

*To all whom it may concern:*

Be it known that I, THÉOPHILE BACKLEJAU, a subject of the King of the Belgians, residing at Mechlin, in the Kingdom of Belgium, have invented a new and useful Improvement in Pressure-Regulators, (for which I have obtained a patent in Belgium, No. 83,217, bearing date September 10, 1888, and in Luxemburg, No. 1,134, bearing date May 13, 1889,) of which the following is a specification.

My invention consists of an improved pressure-regulator for gas and similar fluids, the object, as is usual in such apparatus, being to obtain from a varying pressure at the inlet an even steady flow at the outlet.

To clearly explain the nature of my invention, reference is made to the accompanying drawings, in which—

Figure 1:
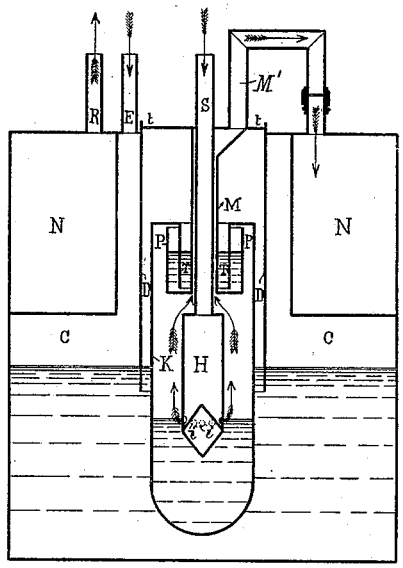
Figure 2:
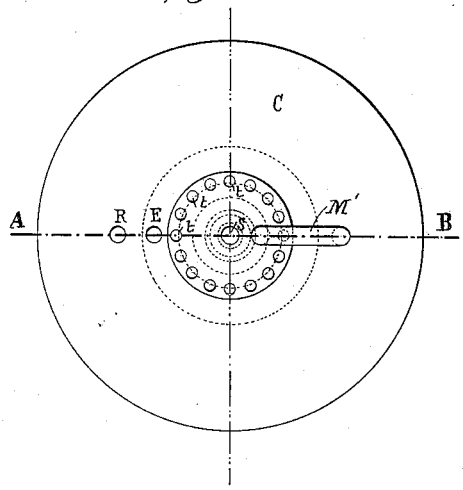

Figure 1 is a sectional elevation of my improved apparatus on the line A B of Fig. 2, which is a plan view of same.

The main body of the apparatus consists of a preferably cylindrical vessel C, which contains an annular chamber N and a cylindrical chamber D, secured in the upper part of the same, the open end of said chamber D dipping below the surface of the liquid which the vessel C contains. The upper part of this chamber D is perforated with holes $t$ for the admission and escape of air. Secured in the upper part of the chamber D is a tube M, the lower end of which terminates in an annular trough P, while the upper communicates with a bent pipe M', which forms a connection with the chamber N. Inside of the tube M is a second tube S, which is fixed in the upper part of the chamber D. Its lower end is enlarged into the tube H, which terminates in a conical end, as shown, around which are orifices $i$, opening into a vessel or float K. This float is partly submerged in the liquid in the vessel C, and is partly filled with liquid. Its upper end passes into the chamber D and carries a short tube T, which dips into a liquid in the trough P, and thus forms a liquid seal for the float K as it rises and falls.

The inlets to the apparatus are the pipe E, which communicates with the vessel C, and the pipe S before referred to, while the outlet is the pipe R, which communicates with the annular chamber N.

The operation of the apparatus is as follows: Gas from the same source of supply is admitted simultaneously through the pipes E and S, that portion passing through E exerting a pressure on the surface of the liquid in the vessel C. The level being thus lowered, the level of the liquid in the chamber D will rise, causing the float K to rise with it and to bring its contained liquid some distance over the openings $i$ in the tube H. The gas which passes into this tube from the pipe S will then, according to its pressure, find a greater or less amount of water in the float K to pass through before it escapes, as shown by the arrows, around the pipe S by the pipes M and M' to the chamber N, and from thence to the outlet R. The diameters of the vessel C and chamber D are so proportioned that when a pressure is exerted in the vessel C through pipe E, causing a rise $a$ of the liquid in the cylinder D, there is a corresponding fall $b$ in the vessel C. On the other hand, the diameters of the float K and the tube H are such that upon a displacement upward $a$ of the float there is a corresponding variation of level of the liquid in the float equivalent to the rise of the liquid-level in D plus the fall in C, or $a+b$. If I fill the float up to the upper part of the holes $i$, it is evident that under an effective pressure of $a+b$ of the gas the water will rise to the extent of $a$ in the cylinder D, and will cause the float to rise to an equal extent; but this displacement causes in the latter an alteration of level equivalent to $a+b$—that is to say, that the holes $i$ will have a load exactly equal to the effective pressure of the gas, and that no flow of gas will take place through them; but if I load the float up to 0.01 below the holes $i$ the displacement $a$ of the liquid in the cylinder D will cause a load (pressure) at the holes $i$ equal to $a+b-0.01$—that is to say, that this pressure will be 0.01 less than the effective pressure of the gas, and that the flow of gas through the orifices will take place under a constant pressure of 0.01.

To obtain at the orifice R a flow under a fixed pressure—say P—it is sufficient therefore to load the float up to a level always below the orifices *i* of an extent equal to P.

What I claim, and desire to secure by Letters Patent, is—

1. In a pressure-regulator, the combination, with a vessel having an inlet, an open-ended chamber dipping into a liquid therein, and a fixed pipe having perforated openings in its base, forming a second inlet, of a float closed by a liquid seal and carrying a liquid adapted to cover the perforations in the fixed pipe to a greater or less degree as the float rises or falls under the varying pressure of the gas in the main chamber, and a suitable outlet from said float, substantially as described.

2. A pressure-regulator consisting of a vessel C, having an inlet, an open-ended chamber dipping into a liquid therein, having air-openings *t*, and a fixed pipe having perforated openings *i* in its base, forming a second inlet, a float closed by a liquid seal and carrying a liquid adapted to cover the perforations *i* to a greater or less degree as the float rises or falls under the varying pressure of the gas, an outlet from said float communicating with a chamber N, and an outlet, substantially as described.

In testimony whereof I have hereunto set my hand in the presence of two subscribing witnesses.

THÉOPHILE BACKLEJAU.

Witnesses:
A. DESGUIN,
F. DE PAUW.

It is hereby certified that the name of the patentee in Letters Patent No. 408,788, granted August 13, 1889, for an improvement in "Pressure-Regulators," was erroneously written and printed "Théophile Backlejau," whereas said name should have been written and printed *Théophile Backeljau;* and that the said Letters Patent should be read with this correction therein that the same may conform to the record of the case in the Patent Office.

Signed, countersigned, and sealed this 17th day of September, A. D. 1889.

[SEAL.]

CYRUS BUSSEY,
*Assistant Secretary of the Interior.*

Countersigned:

C. E. MITCHELL,
*Commissioner of Patents.*